| United States Patent [19] | [11] | 4,139,512 |
|---|---|---|
| Buxbaum | [45] | Feb. 13, 1979 |

[54] COPOLYESTERS OF TRIAZINEDICARBOXYLIC ACIDS

[75] Inventor: Lothar Buxbaum, Lindenfels, Odenwald, Fed. Rep. of Germany

[73] Assignee: Ciba-Geigy Corporation, Ardsley, N.Y.

[21] Appl. No.: 836,940

[22] Filed: Sep. 27, 1977

[30] Foreign Application Priority Data

Oct. 7, 1976 [CH] Switzerland ............... 12699/76

[51] Int. Cl.² ............................................. C08G 63/68
[52] U.S. Cl. ............................. 260/22 D; 260/37 N; 260/40 R; 528/184; 528/289
[58] Field of Search ............... 260/47 CZ, 75 N, 22

[56] References Cited

U.S. PATENT DOCUMENTS

| 3,393,180 | 7/1968 | Thoma et al. .................. 260/78 |
| 3,717,614 | 2/1973 | Lyssy et al. .................. 260/77.5 |
| 3,772,250 | 11/1973 | Economy et al. ............ 260/47 CP |
| 3,920,611 | 11/1975 | Rio et al. .................... 260/47 CP |

*Primary Examiner*—Lester L. Lee
*Attorney, Agent, or Firm*—Luther A. R. Hall

[57] ABSTRACT

Linear thermoplastic polyesters containing, in the main, triazinedicarboxylic acids as the acid constituent are modified with relatively long-chain aliphatic dicarboxylic acids. By this means, the processability is improved and the notched impact strength is increased, without other mechanical properties being substantially changed.

21 Claims, No Drawings

COPOLYESTERS OF TRIAZINEDICARBOXYLIC ACIDS

The present invention relates to copolyesters of specific triazinedicarboxylic acids, and, if desired, aromatic dicarboxylic acids in addition, diols having aliphatic and/or cycloaliphatic diol groups and aliphatic dicarboxylic acids having at least 6 C atoms.

It has already been proposed in German Offenlegungsschrift (DT-OS) 2,121,184 to use s-triazinedicarboxylic acids or their esters for the preparation of polymers, such as polyesters, polyamides, polybenzimidazoles or polybenzoxalones. Although the polyesters prepared, for example, from s-triazinedicarboxylic acids and alkanediols are distinguished by high glass transition temperatures, they have the disadvantage that they cannot be processed readily since relatively high temperatures are required for the processing of these compounds.

The processability of a thermoplastic moulding composition is essentially determined by its melting point or melting range and its melt viscosity. In German Offenlegungsschriften 2,533,675 and 2,533,715, it is proposed that heterocyclic diols be co-condensed, as co-components, into the abovementioned polyesters in order to improve the relationship between the processability and the glass transition temperature of the said polyesters. The softening range can, indeed, be lowered by this means but the lowering in the melt viscosity is not very pronounced. In the case of these moulding compositions, it is also desirable further to improve the toughness characteristics in particular.

The object of the present invention is to lower the melt viscosity of these moulding compositions, in order to improve the processability, by the use of modified co-components, and, as a result, to change the mechanical properties only slightly but to improve the touchness characteristics.

The present invention relates to linear thermoplastic copolyesters which have a relative viscosity of at least 1.30, measured on a solution of 1 g of polyester in 100 ml of a solvent consisting of equal parts of phenol and symmetrical tetrachloroethane at 30° C., and consist, relative to the polyester, of (a) at least 49.5–30 mol % of a dicarboxylic acid of the formula I

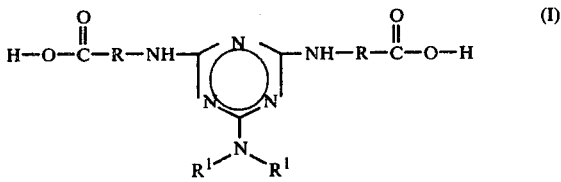

in which R is alkylene having 1 to 3 C atoms, cyclohexylene or phenylene and $R^1$ is methyl, ethyl, cyclohexyl or phenyl, (b) 0–20 mol % of at least one aromatic dicarboxylic acid and (c) 50 mol % of at least one diol having aliphatic and/or cycloaliphatic diol groups, wherein (d) 0.5 to 5 mol % of radicals of one or more linear or branched aliphatic dicarboxylic acids having at least 6 C atoms has been co-condensed as a modifying component.

The relative viscosity is preferably 1.5 to 3.5.

Preferably, the polyesters contain the aromatic dicarboxylic acids (b) to the extent of up to 10 mol % and, in particular, apart from the dicarboxylic acids (a), only the dicarboxylic acids (d) are co-condensed.

In the dicarboxylic acids of the formula I, R is preferably m- or p-phenylene and $R^1$ is ethyl or phenyl. In particular, R is p-phenylene and $R^1$ is phenyl. When it is alkylene, R can be linear or branched, whilst cyclohexylene is preferably understood as meaning the m- and p-structural isomers. The dicarboxylic acids of the formula I are described in German Offenlegungsschrift 2,121,184.

Suitable aromatic dicarboxylic acids are, especially, terephthalic acid and isophthalic acid and also o-phthalic acid, 1,3-, 1,4-, 2,6- or 2,7-naphthalenedicarboxylic acid, 4,4'-diphenyldicarboxylic acid, 4,4'-diphenylsulphonedicarboxylic acid, 1,1,3-trimethyl-5-carboxyl-3-(p-carboxyphenyl)methane, bis-p-(carboxyphenyl)-methane and stilbenedicarboxylic acid.

A diol having cycloaliphatic diol groups which may be mentioned in particular is 1,4-dihydroxycyclohexane.

Diols having aliphatic diol groups which can be used are, especially, the alkylenediols. These can be branched but are preferably linear. They contain preferably 3 to 12, and especially 2 to 6, C atoms. In this group, ethylene glycol, tetramethylene glycol and hexamethylene glycol are particularly preferred. A further preferred diol is 1,4-(dihydroxymethyl)-cyclohexane.

The diol having aliphatic diol groups can also be a β-hydroxyalkylated bisphenol, the hydroxyalkyl containing 3, and especially 2, C atoms. The bisphenol from which these diols are derived can be represented by the following formula:

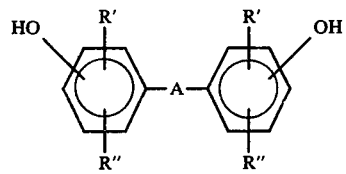

The hydroxyl groups can be in the m-position, but especially in the p-position. In this formula, R' and R" can be alkyl having 1 to 6 C atoms, halogen, such as chlorine or bromine, and especially hydrogen atoms. A can be a direct bond or O, S, $SO_2$, substituted or unsubstituted alkylidene, cycloalkylidene or alkylene.

Examples of substituted or unsubstituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are: methylene, ethylene, phenylmethylene, diphenylmethylene and methylphenylmethylene.

Examples of cycloalkylidene are: cyclopentylidene, cyclohexylidene, cycloheptylidene and cyclooctylidene.

Examples of bisphenols are: bis-(p-hydroxyphenyl) ether or bis-(p-hydroxyphenyl) thioether, bis-(p-hydroxyphenyl)sulphone, bis-(p-hydroxyphenyl)-methane, 1,2-bis-(p-hydroxyphenyl)-ethane, phenyl-bis-(p-hydroxyphenyl)-methane, diphenylbis-(p-hydroxyphenyl)-methane, 2,2-bis-(4'-hydroxy-3'-methylphenyl)-propane, 1,1- or 2,2-bis-(p-hydroxyphenyl)-butane, 1,1-dichloro- or 1,1,1-trichloro-2,2-bis-(p-hydroxyphenyl)ethane, 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

A particularly preferred diol from this group is 2,2-bis-[4'-(β-hydroxyethyl)-phenyl]-propane.

A further group of diols having aliphatic diol groups comprises those of the general formula II

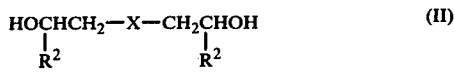

in which $R^2$ is methyl and preferably a hydrogen atom and X is a radical of the formulae IIIa–IIIc

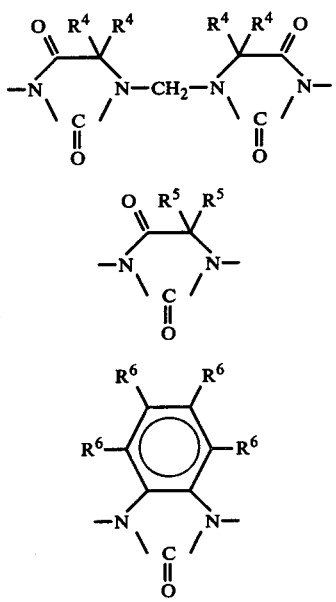

in which the $R^3$, $R^4$ and $R^5$ independently of one another are alkyl having 1 to 4 C atoms or together are tetramethylene or pentamethylene, and the $R^6$ independently of one another are a hydrogen, chlorine or bromine atom.

The diols of the formula II are known and are described, for example, in German Offenlegungsschriften 1,812,003, 2,342,432, 2,342,372 and 2,453,326. Examples are: N,N'-bis-(β-hydroxyethyl-5,5-dimethyl)-hydantoin, N,N'-bis-(β-hydroxypropyl-5,5-dimethyl)-hydantoin, methylene-bis-[N,N'-(β-hydroxyethyl)-5-methyl-5-ethyl-hydantoin], methylene-bis-[N-(β-hydroxyethyl)-5,5-dimethyl-hydantoin], N,N'-bis-(β-hydroxyethyl)-benzimidazolone, -(tetrachloro)-benzimidazolone or -(tetrabromo)-benzimidazolone.

Preferably, in formula II, $R^2$ is a hydrogen atom, $R^3$, $R^4$ and $R^5$ are methyl and all of the $R^6$ are either a hydrogen atom, a chlorine atom or a bromine atom.

The copolyesters can also contain mixtures of the diols having aliphatic diol groups. The copolyesters preferably contain, relative to the sum of the diols, at least 50 mol % of alkylenediols and at most 50 mol % of β-hydroxyalkylated bisphenol having 2 to 3 C atoms in the alkylene and/or diols of the formula II. In particular, the copolyesters contain 70 to 96 mol % of alkylenediols and contain the other diols mentioned above as the remainder, to make up to 100 mol %.

The aliphatic dicarboxylic acids (d) preferably contain 6–40, and especially 9–30, C atoms. Examples are: adipic acid, pimelic acid, suberic acid, azelaic acid, sebacic acid, trimethyladipic acid, t-butyladipic acid, tetradecanedicarboxylic acid, octadecanedicarboxyclic acid, alkylated malonic or succinic acids having, preferably, 12 to 24 C atoms in the alkyl, such as decyl-, dodecyl-, tetradecyl-, octadecyl- or eicosyl-malonic or -succinic acid and dimeric acids. Dimeric acids is a term used to signify the dimerisation products of higher unsaturated fatty acids, for example oleic acid. These dicarboxylic acids can contain up to 40 C atoms and more and are commercially obtainable (manufacturer: Unilever-Emery, Gouda, Holland). Amongst these dicarboxylic acids, that having 36 C atoms is particularly preferred and in the text which follows is termed dimeric acid (Empol 1010 from Unilever-Emery).

A preferred sub-group comprises those copolyesters which contain 0.5 to 2 mol % of dimeric acid or 1 to 5 mol % of sebacic acid, trimethyladipic acid, azelaic acid or an alkylsuccinic acid having 12–24 C atoms.

A further preferred sub-group comprises the copolyesters which consist of the dicarboxylic acids (a) and (d) and of alkylenediols having, preferably, 2 to 6 C atoms.

The copolyesters which consist of 48–49 mol % of a dicarboxylic acid of the formula I, in which R is p-phenylene and $R^1$ is phenyl, 50 mol % of ethylene glycol or butane-1,4-diol and 1–2 mol % of dimeric acid are particularly valuable.

The polyesters according to the invention are obtained according to known processes by subjecting the dicarboxylic acids, or their polyester-forming derivatives, to a polycondensation reaction with at least one diol having aliphatic alcohol groups at temperatures of 50° to 320° C., under normal pressure, in vacuo and/or in a stream of inert gas, until the desired viscosity is reached.

The known processes for the preparation of the novel polyesters are, for example, solution condensation or azeotropic condensation, interfacial condensation, melt condensation or solid phase condensation as well as combinations of these methods, depending on which polyester-forming derivatives and reaction catalysts are used. Solid phase condensation can also be carried out in thin layers, if necessary with the aid of a solid parting agent, for example micromica, talc, titanium dioxide or glass balls.

Polyester-forming derivatives of the dicarboxylic acids which are used are, in the main, the low-molecular dialkyl esters having 1 to 4 carbon atoms in the molecule, preferably the dimethyl esters, or diphenyl esters. Furthermore, the acid dihalides, especially the acid dichlorides, and the mixed anhydrides obtained from the dicarboxylic acids and low-molecular aliphatic monocarboxylic acids are also suitable.

In one embodiment, the polyesters according to the invention can be prepared by esterifying or trans-esterifying the dicarboxylic acid, or several dicarboxylic acids, or their low-molecular dialkyl esters, with diols having aliphatic alcohol groups, at 150°–250° C. in an inert atmosphere, for example a nitrogen atmosphere, in the presence of catalysts and while at the same time removing the water or alkanol formed, and subsequently carrying out the polycondensation reaction at 200° to 320° C. and under reduced pressure in the presence of specific catalysts until the polycondensation products have the desired viscosity. After it has been removed from the reaction vessel and cooled, the resulting polyester melt is granulated or broken into chips in a conventional manner.

The molar ratio of the acid component and diol component is, in general, 1:1; if one of the two components is volatile under the conditions of the polycondensation reaction, this component can also be employed in excess. Advantageously, 30–47.5% of the acid component are employed in the form of a dialkyl ester, and after the trans-esterification has taken place, the remainder of the acid component is added in the form of the free acid.

Esterification catalysts which can be used are, in a known manner, amines and inorganic or organic acids, for example hydrochloric acid or p-toluenesulphonic acid, or, alternatively, metals or metal compounds which are also suitable as trans-esterification catalysts.

Since some catalysts preferentially accelerate transesterification and others preferentially accelerate the polycondensation reaction, a combination of several catalysts is advantageously used. Examples of suitable transesterification catalysts are the oxides, salts or organic compounds of the metals calcium, magnesium, zinc, cadmium, manganese, titanium and cobalt. It is also possible to use the metals themselves as catalysts. The polycondensation reaction is catalysed, for example, by metals such as lead, titanium, germanium and, especially, antimony or tin, and the compounds thereof. These catalysts can be added together or separately to the reaction mixture. These catalysts are employed in amounts of about 0.001 to 1.0 percent by weight, relative to the acid component.

Those catalysts which accelerate both the transesterification and the polycondensation reaction are particularly advantageously used in the preparation of the polyesters according to the invention. Possible catalysts of this type are, in particular, mixtures of different metals or metal compounds and also corresponding metal alloys.

Another embodiment for the preparation of the novel polyesters consists in subjecting one or more dicarboxylic acid dihalides, preferably the acid dichlorides, to a polycondensation reaction with diols having aliphatic alcohol groups, in the presence of a basic catalyst, in the temperature range from 0° to 100° C., with the elimination of hydrogen halide. The basic catalysts used are preferably amines or quaternary ammonium salts. The proportion of basic catalyst can be from 0.1 to 100 mol %, relative to the acid halides. This process can also be carried out without a solvent, or in the presence of a solvent.

The polycondensation reaction can also be carried out by first subjecting the starting compounds to a condensation reaction in the melt until a certain viscosity is reached, then granulating the precondensate prepared in this way, for example with the aid of an underwater granulator, and drying the granules and then subjecting them to a solid phase condensation reaction, for which vacuum and temperatures below the melting point of the granules are employed. Higher viscosities can be achieved by this means.

In a special embodiment, the aliphatic dicarboxylic acid (d) is added after the trans-esterification. It is also possible to prepare polyester precondensates from dicarboxylic acids of the formula I, if desired aromatic dicarboxylic acids (d), and diols (c) and polyester precondensates from dicarboxylic acids (d) and diols (c), to mix these two precondensates in the melt and then to subject the mixture to a polycondensation reaction in the melt phase and/or solid phase until the desired viscosity is reached. When the process is carried out in this way, copolyesters are obtained which contain, in the main, blocks of the starting materials.

Inert additives of all types, for example fillers or reinforcing fillers, such as talc, kaolin, metal powders, wollastonite, glass balls and, especially, glass fibres, inorganic or organic pigments, optical brighteners, delustering agents, mould release agents, agents which promote crystallisation and flameproofing agents, can be added to the reaction mass during working up of the polyester melt or even prior to the polycondensation reaction.

If the polycondensation reaction is carried out discontinuously, the inert additives can already be added during the final condensation steps, for example during the solid phase condensation reaction, or at the end of the melt condensation.

The polyesters according to the invention can be partially crystalline or amorphous, depending on which diols and which dicarboxylic acids are used as the starting components and on the ratios in which these are employed. The polyesters are colourless to yellow-coloured and are thermoplastic materials (engineering plastics), from which mouldings having valuable properties can be produced by the conventional shaping processes, such as casting, injection moulding and extruding. Examples of such mouldings are components for technical equipment, apparatus casings, household equipment, sports equipment, electrical insulations, car components, circuits, sheets, films and semi-finished products which can be shaped by machining. It is also possible to use the polyesters for coating articles by known powder coating processes or from solutions and for the production of fibres.

The melt viscosity of the polyesters according to the invention is, surprisingly, lowered to such an extent that it is possible to process the polyesters without problems at relatively low temperatures without the filling of the mould being impaired. The toughness characteristics are surprisingly improved compared with those of non-modified polyesters, while the heat distortion point and the glass transition temperatures decrease only slightly. Other mechanical properties, such as the flexural strength and the modulus of elasticity are only slightly changed. The polyesters according to the invention thus have an outstanding spectrum of mechanical properties, coupled with improved processability. Surprisingly, the absorption of water in the copolyesters according to the invention is also reduced, compared with that in the non-modified polyesters.

The polyesters prepared according to the examples which follow are characterised in more detail by the following identifying data. The polyesters are characterised by those morphological changes which are measured by means of differential thermal analysis on a sample which has been heat-treated at 30° C. above the melting point or above the softening point for 3 minutes and then rapidly chilled. The chilled sample is heated at a heating rate of 16° C./minute by means of a "DSC-1B" Differential Scanning Colorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the turning point at the sudden increase in the specific heat in the thermogram, the crystallisation temperature is given as the apex of the exothermic peak, the melting point is given as the apex of the endothermic peak and the decomposition temperature ($T_d$) is given as that point at which the sudden exothermic and endothermic variations in the specific heat start. The relative viscosity of the polycondensation products of the examples is determined on solutions of 1 g of polyester in 100 ml of a mixture consisting of equal parts of phenol and symmetrical tetrachloroethane, at 30° C. The softening temperature ($T_s$) is determined on a Kofler heated stage microscope at a heating rate of 15° C./minute, a cross being formed from 2 filaments and the softening point being designated as that temperature at which the sharp angles of the cross disappear.

The examples which follow serve to illustrate the invention further.

EXAMPLES 1-6 AND A COMPARISON EXAMPLE

2-Diphenylamino-4,6-bis-(p-carbethoxyanilino)-s-triazine (TDCS) (see the Table which follows for precise molar ratios), 1,4-butanediol (B 14) in four times the molar amount, relative to the acid components, and 0.01% by weight of titanium (relative to the acid components) in the form of the tetraisopropylate are filled into a 10 liter reactor fitted with a stirrer, a nitrogen inlet, a separating column and a device for measuring the temperature, and the mixture is heated to 170° C. 95% of the amount of ethanol theoretically to be expected is distilled off in the course of 2 hours, while stirring, passing nitrogen into the mixture and further raising the temperature up to 240° C.

The trans-esterification product which is thus obtained is transferred into a second reactor and the aliphatic dicarboxylic acid is added. After a reaction time of 30 minutes and after the temperature has been raised to 270° C., a vacuum of 0.6 mm Hg is applied in the course of 30 minutes, and during this period the temperature is raised to 280° C. The reaction is discontinued 15 minutes after the vacuum of 0.6 mm Hg has been reached and the polymer formed is discharged, comminuted and applied in a thin layer to Teflon-coated sheet metal and subjected to a polycondensation reaction in a vacuum drying cabinet at 220° C. and under 0.5 mm Hg for 72 hours.

The polymer thus obtained is processed to test pieces and the results are summarised in the table which follows.

Table

| Composition of the polymer | | Molar ratios | | | | | | |
|---|---|---|---|---|---|---|---|---|
| TDCS + dimeric acid + B 14 | | 48:2:50 | 49:1:50 | 49.5 0.5:50 | | | | |
| TDCS + azelaic acid + B 14 | | | | | 46.865: 3.135:50 | | | |
| TDCS + dodecyl-succinic acid + B 14 | | | | | | 48:2:50 | | |
| TDCS + octadecyl-succinic acid + B 14 | | | | | | | 48:2:50 | |
| TDCS + B 14 | | | | | | | | 50:50 |
| Processing temperatures (° C) | | 260/270 | 260/270 | 280/290 | 250/260 | 260/270 | 260/270 | 320/330 |
| $n_{rel}$ (polymer) | | 2.39 | 2.39 | 2.41 | 1.98 | 2.13 | 2.20 | 2.01 |
| $n_{rel}$ (test piece) | | 1.73 | 1.80 | 1.77 | 1.71 | 1.65 | 1.66 | 1.63 |
| Glass transition temperature (° C) | | 171 | 177 | — | 174 | 175 | 165 | 186 |
| Property | Measurement method | | | | | | | |
| Flexural strength (kp/cm$^2$) | DIN 53,452 NKS | 1,440 | 1,300 | 1,300 | 1,255 | 1,350 | 1,400 | 1,330 |
| Modulus of elasticity from a bending test (kp/cm$^2$) | ASTM D 790 | 23,000 | 20,000 | 21,000 | 20,500 | 22,000 | 22,000 | 23,000 |
| Impact strength (cmkp/cm$^2$) | DIN 53,453 NKS | no break | no break | no break | no break | no break | no break | 75 |
| Notched impact strength (cmkp/cm$^2$) | DIN 53,453 NKS | 5.6 | 5.2 | 4.8 | 3.7 | 4.2 | 4.0 | 3.5 |
| Heat distortion point (° C) | ISO/R 75 PS A | 139 | 145 | 147 | 145 | 141 | 135 | 150 |
| Absorption of water (%) | 50 days in H$_2$O | 1.6 | 1.7 | 1.8 | 1.6 | 1.7 | 1.5 | 2.0 |
| Tracking resistance | DIN 53,480 KC | > 600 | > 600 | > 600 | — | > 600 | > 600 | 600 |
| Arcing resistance | ASTM D 495 | 74 | 65 | 70 | — | 73 | 67 | 64 |
| Example No. | | 1 | 2 | 3 | 4 | 5 | 6 | Comparison Example |

EXAMPLES 7-14

The polyesters listed in the table which follows are prepared, analogously to Examples 1-6, in a 200 ml glass reactor fitted with a stirrer, a N$_2$ inlet and a distillation head with a condenser, the batch size being between 10 and 50 g.

A post-condensation in a thin layer is not carried out, but is possible.

| Example No. | Composition | Molar ratio | $n_{rel}$ | Tg(° C) | $T_s$(° C) |
|---|---|---|---|---|---|
| 7 | ETDCS + DA + B 14 + CHDM | 0.49:0.01: 2:0.25 | 1.45 | 149 | 175 |
| 8 | TDCS + DMT + DA + ethylene glycol | 0.39:0.1: 0.01:3 | 1.31 | 195 | 210 |
| 9 | TDCS + DMT + DA + ethylene glycol | 0.29:0.2: 0.01:3 | 1.35 | 171 | 205 |
| 10 | TDCS + diethyl adipate + B 14 + D 22 | 0.45:0.05: 2:0.25 | 1.29 | 160 | 175 |
| 11 | TDCS + trimethyladipic acid + hexane-1,6-diol | 0.49:0.01:3 | 1.74 | 171 | 205 |
| 12 | TDCS + DA + B 14 + compound 935 | 0.49:0.01: 2:0.15 | 1.27 | 181 | 205 |
| 13 | TDCS + DA + B 14 + compound 996 | 0.49:0.01: 2:0.1 | 1.31 | 167 | 165 |
| 14 | TDCS + DA + B 14 + | 0.49:0.01: | 1.30 | 179 | 200 |

| Example No. | Composition | Molar ratio | $n_{rel}$ | Tg(° C) | $T_s$(° C) |
|---|---|---|---|---|---|
| | compound 2746 | 2:0.02 | | | |

ETDCS = 2-diethylamino-4,6-bis-(p-carbethoxyanilino)-s-triazine
DA = dimeric acid
B 14 = butane-1,4-diol
CHDM = 1,4-cyclohexanedimethanol
DMT = dimethyl terephthalate
D 22 = 2,2-bis-[4'-(β-hydroxyethoxy)-phenyl]-propane
Compound 935 = 1,1-methylene-bis-[3-(hydroxyethyl)-5,5-dimethylhydantoin]
compound 996 = 1,3-bis-(hydroxyethyl)-5,5-dimethylhydantoin
compound 2746 = 1,3-bis-(hydroxyethyl)-4,5,6,7-tetrabromo-benzimidazolone

What is claimed is:

1. A linear thermoplastic copolyester which has a relative viscosity of at least 1.30, measured on a solution of 1 gram of polyester in 100 ml of a solvent consisting of equal parts of phenol and symmetrical tetrachloroethane at 30° C., which comprises the condensation product in about a 1:1 molar ratio of diacids (a), (b) and (d) with diols (c) so that the composition of the polyester comprises in the diacid component of the polyester
   (a) from 49.5 to 30 mol %, based on the total polyester, of radicals of a dicarboxylic acid of the formula I

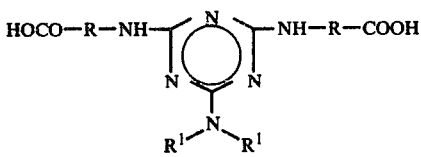

in which R is alkylene having 1 to 3 carbon atoms, cyclohexylene or phenylene, and $R^1$ is methyl, ethyl, cyclohexyl or phenyl;
   (b) from 0 to 20 mol %, based on the total polyester, of radicals of at least one aromatic dicarboxylic acid; and
   (d) from 0.5 to 5 mol %, based on the total polyester, of radicals of one or more linear or branched aliphatic dicarboxylic acid having at least 6 carbon atoms; and
   in the diol component of the polyester
   (c) 50 mol %, based on the total polyester, of radicals of at least one aliphatic diol, cycloaliphatic diol or mixture thereof,
   wherein the radicals (a), (b) and (d) are attached to radicals (c) through ester linkages in a random distribution.

2. A copolyester according to claim 1, wherein the amount of the aromatic dicarboxylic acid of component (b) is up to 10 mol %.

3. A copolyester according to claim 1, wherein, in formula I, R is m- or p-phenylene and $R^1$ is ethyl or phenyl.

4. A copolyester according to claim 3, wherein, in formula I, R is p-phenylene and $R^1$ is phenyl.

5. A copolyester according to claim 1, wherein the aromatic dicarboxylic acid is terephthalic acid, isophthalic acid or mixture thereof.

6. A copolyester according to claim 1, wherein the diol having aliphatic diol groups is an alkylenediol having 2 to 12 C atoms, or is 1,4-(dihydroxymethyl)-cyclohexane.

7. A copolyester according to claim 6, wherein the diol is ethylene glycol, tetramethylene glycol or hexamethylene glycol.

8. A copolyester according to claim 1, wherein the diol having aliphatic diol groups is a β-hydroxyalkylated bisphenol, in which the hydroxyalkyl group contains 2 to 3 C atoms.

9. A copolyester according to claim 8, wherein the diol is 2,2-bis-[4'-(β-hydroxyethyl)-phenyl]-propane.

10. A copolyester according to claim 1, wherein the diol having aliphatic diol groups is of formula II

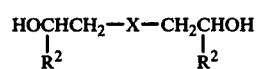

in which $R^2$ is methyl or a hydrogen atom and X is a radical of the formulae IIIa–IIIc

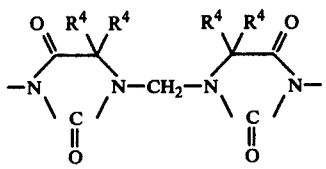

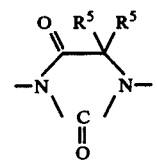

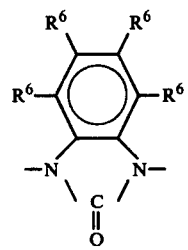

in which the $R^3$, $R^4$ and $R^5$ independently of one another are alkyl having 1 to 4 C atoms or together are tetramethylene or pentamethylene, and the $R^6$ independently of one another are a hydrogen atom, a chlorine atom or a bromine atom.

11. A copolyester according to claim 10, wherein $R^2$ is a hydrogen atom, $R^3$, $R^4$ and $R^5$ are methyl and all the $R^6$ are either a hydrogen atom, a chlorine atom or a bromine atom.

12. A copolyester according to claim 1 which contains radicals of mixtures of the diols having aliphatic diol groups.

13. A copolyester according to claim 12, which contains, relative to the sum of the diols, at least 50 mol % of alkylenediols; and at most 50 mol % of a β-hydroxyalkylated bisphenol having 2 to 3 C atoms in the alkylene, diols of the formula II or mixture thereof.

14. A copolyester according to claim 13, which contains 70 to 96 mol % of an alkylenediol.

15. A copolyester according to claim 1, wherein the aliphatic dicarboxylic acid (d) contains 6 to 40 C atoms.

16. A copolyester according to claim 1, which contains radicals of 0.5 to 2 mol % of dimeric acid or 1 to 5 mol % of sebacic acid, trimethyladipic acid, azelaic acid or an alkylsuccinic acid having 12 to 24 C atoms in the alkyl group.

17. A copolyester according to claim 1, which consists of radicals of dicarboxylic acids of components (a) and (d) and of alkylenediols of component (c) having 2 to 6 C atoms.

18. A copolyester according to claim 17, which consists of radicals of 48–49 mol % of a dicarboxylic acid of the formula I in which R is p-phenylene and $R^1$ is phenyl, 50 mol % of ethylene glycol or butane-1,4-diol and 1–2 mol % of dimeric acid.

19. A copolyester according to claim 6 wherein the aliphatic diol of component (c) is an alkylenediol of 2 to 6 carbon atoms.

20. A copolyester according to claim 10 wherein diol of general formula II $R^2$ is hydrogen.

21. A copolyester according to claim 15 wherein the aliphatic dicarboxylic acid of component (d) contains 9 to 36 carbon atoms.

* * * * *